United States Patent
Heayes

(10) Patent No.: US 6,602,066 B1
(45) Date of Patent: Aug. 5, 2003

(54) EXTRUDER FOR FORMABLE MATERIALS

(75) Inventor: Richard John Heayes, Oxfordshire (GB)

(73) Assignee: Hasbro, Inc., Pawtucket, RI (US)

( * ) Notice: Subject to any disclaimer, the term of this patent is extended or adjusted under 35 U.S.C. 154(b) by 339 days.

(21) Appl. No.: 09/755,195

(22) Filed: Jan. 8, 2001

(51) Int. Cl.[7] .............................................. B29C 47/08
(52) U.S. Cl. .............................. 425/382.3; 425/131.1; 425/192 R; 425/461; 425/462; 425/465; 425/466
(58) Field of Search ......................... 425/131.1, 192 R, 425/381.2, 382.3, 461, 462, 465, 466

(56) References Cited

U.S. PATENT DOCUMENTS

| | | | | |
|---|---|---|---|---|
| 2,420,616 A | * | 5/1947 | Palmer ........................ | 425/72.1 |
| 2,578,105 A | * | 12/1951 | Taylor ......................... | 425/568 |
| 3,157,933 A | * | 11/1964 | Boggild et al. .............. | 425/190 |
| 3,262,404 A | * | 7/1966 | Morz et al. .................. | 425/183 |
| 3,264,685 A | * | 8/1966 | Boggild et al. .............. | 425/183 |
| 3,685,936 A | | 8/1972 | Meth et al. .................. | 425/195 |
| 3,892,510 A | * | 7/1975 | Meth et al. .................. | 425/173 |
| 4,014,972 A | | 3/1977 | Rentz .......................... | 264/245 |
| 4,076,476 A | | 2/1978 | Ventura ....................... | 425/183 |
| 4,569,815 A | * | 2/1986 | Rentz et al. ................. | 264/323 |
| 4,815,961 A | | 3/1989 | Kindred ....................... | 425/544 |
| 4,993,932 A | * | 2/1991 | D'Andrade .................. | 425/154 |
| 5,183,671 A | * | 2/1993 | Perez .......................... | 425/190 |
| 5,409,364 A | | 4/1995 | Schultheis et al. ........... | 425/183 |
| 5,431,866 A | | 7/1995 | DeMasters et al. .......... | 264/40.1 |
| 5,891,502 A | | 4/1999 | Heck et al. .................. | 426/516 |

* cited by examiner

Primary Examiner—James P. Mackey
Assistant Examiner—Joseph Leyson
(74) Attorney, Agent, or Firm—Fish & Richardson P.C.

(57) ABSTRACT

A toy includes a chamber having a longitudinal axis, a hollow interior, a first opening, and a second opening. The toy includes a die coupled to the first opening of the chamber, and an extruder received at the second opening of the chamber. A cavity is defined and bound by the interior of the chamber, the first opening, and the extruder. The extruder is positioned to advance longitudinally through the chamber relative to the die. Rotation of the extruder causes the chamber and formable compound received within the cavity to rotate relative to the die, and advancement of the extruder forces the rotating formable compound through the die.

12 Claims, 8 Drawing Sheets

EXTRUDER FOR FORMABLE MATERIALS

TECHNICAL FIELD

This invention relates to an extruder for a formable material.

BACKGROUND

Formable materials (such as, for example, the popular Play-Doh® formable material) are used by children to form a variety of shapes and articles. Formable materials may be molded by hand or by molds. Additionally, extrusion devices may be used to mold formable materials into shapes and articles.

SUMMARY

In one general aspect, a toy includes a chamber having a longitudinal axis, a hollow interior, a first opening, and a second opening. The toy includes a die coupled to the first opening of the chamber, and an extruder positioned at the second opening of the chamber. A cavity is defined by the interior of the chamber, the first opening, and the extruder. The extruder is configured to rotate and to advance longitudinally through the chamber relative to the die. Rotation of the extruder causes the chamber and the formable compound received within the cavity to rotate relative to the die, and advancement of the extruder forces the rotating formable compound through the die.

Implementations may include one or more of the following features. For example, the toy may include a housing that includes a body, a first shelf extending from a first portion of the body, a second shelf extending from a second portion of the body, and a base that supports the body. The extruder may be mounted to the second shelf and able to move relative to the housing. The chamber may be positioned between the first shelf and the second shelf to receive the extruder and to rotate relative to the housing. The die may be positioned between the chamber and the first shelf and is stationary with respect to the housing. The second opening of the chamber may be coupled to the second shelf.

The toy may include a rotary device that causes rotation of the extruder. The rotary device may include a crank. The rotary device may include an electro-mechanical device.

The extruder may include a surface that contacts the formable compound received within the cavity, and a diameter of the cylindrical interior may be approximately the same as a diameter of the extruder surface. The extruder may include a screw.

In another general aspect, forming a formable compound includes coupling a first opening of a chamber to a die. The chamber has a longitudinal axis and a hollow interior. An extruder is received at a second opening of the chamber to define a cavity bound by the hollow interior, the extruder, and the first opening. Formable compound is received within the cavity. The extruder is advanced along the longitudinal axis of the chamber and the chamber and the formable compound are rotated relative to the die, such that movement of the extruder forces the formable compound through the die.

Embodiments may include one or more of the following features. For example, the received formable compound may have a first color. A formable compound of a second color may be received within the cavity.

The extruder may be mounted to a second shelf of a housing to permit movement of the extruder relative to the housing. The chamber may be positioned between the first shelf and a second shelf of the housing to receive the extruder and to rotate relative to the housing. The die may be positioned between the chamber and the first shelf, the die being stationary with respect to the housing.

Advancement of the extruder may include rotation of the extruder around the longitudinal axis. Advancement of the extruder may include rotating a rotary device attached to the extruder. The rotary device may include a crank. The rotary device may include an electro-mechanical device. Advancement of the extruder may include contacting a surface of the extruder to the formable compound.

The toy may be used to form ornamental twist extrusions. In particular, the toy may be used to form multi-colored twist extrusions by filling the cavity with two or more differently-colored formable compounds.

Other features and advantages will be apparent from the description and drawings, and from the claims.

DESCRIPTION OF DRAWINGS

Like reference symbols in the various drawings indicate like elements.

DETAILED DESCRIPTION

Figure 1:
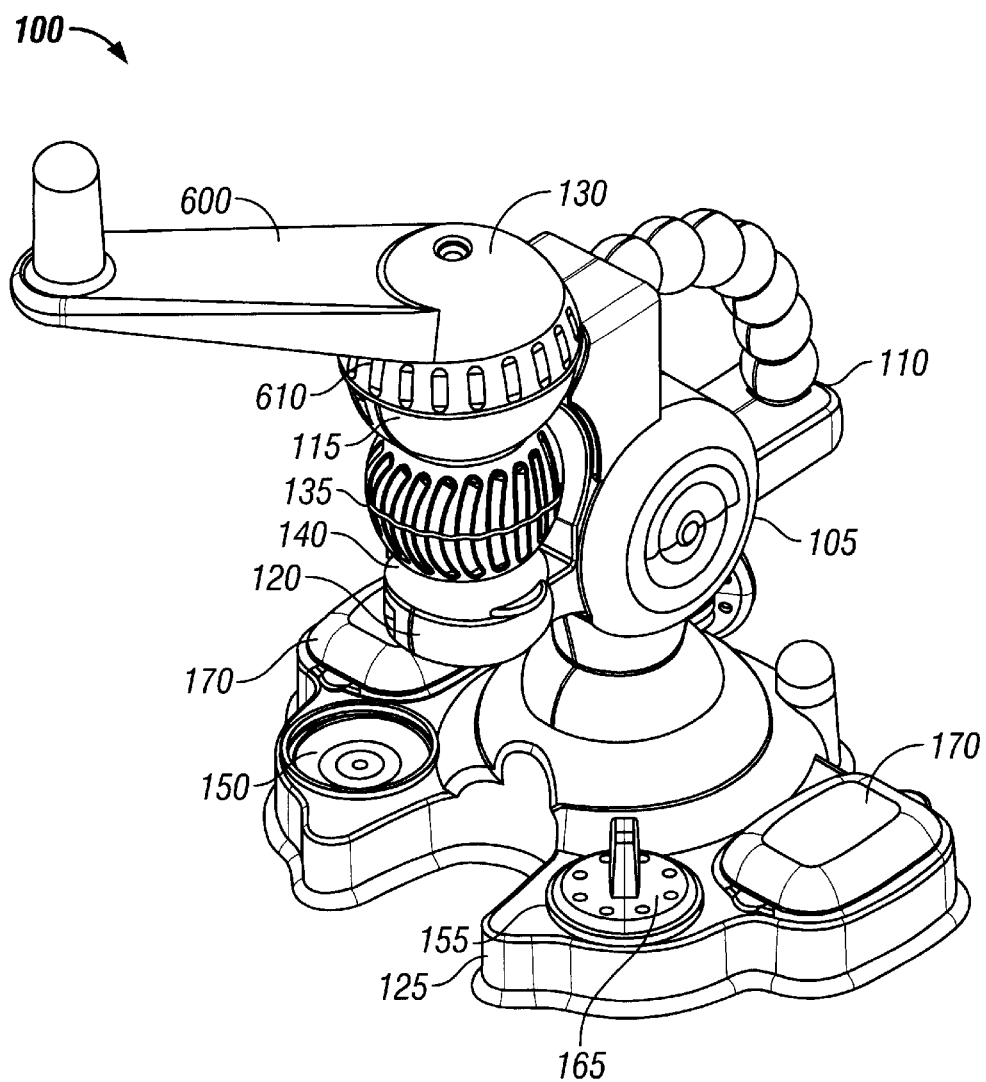
FIG. 1 is a perspective view of a toy for extruding formable compound.

Referring to FIGS. 1–4, a toy 100 for extruding formable compound includes a housing 105 having a body 110, a first shelf 120 extending from a first portion of the body 110, a second shelf 115 extending from a second portion of the body 110, and a base 125 that supports the body 110.

The toy 100 includes a plunger 130 mounted to the upper shelf 115, a chamber 135 positioned between the second shelf 115 and the first shelf 120 to receive the plunger 130, and a die 140 positioned between the chamber 135 and the first shelf 120.

The housing 105, the plunger 130, the chamber 135, and the die 140 may be made of any of the various materials that have suitable properties (such as, for example, durability, low weight, and safety) for such a toy. For example, suitable materials include, but are not limited to, plastics such as resins, polymers, elastomers, or thermoplastics. The housing 105, the plunger 130, the chamber 135, and the die 140 may be formed using any suitable well molding technique, such as, for example, injection molding. The various parts of the toy 100, including the plunger 130, the chamber 135, and the die 140, may be removable from the housing 105 to facilitate assembly and usage.

Additionally, the housing 105 may be formed of two hollow sides 145 that secure to the base 125 to facilitate assembly and reduce weight. The base 125 may have additional features such as molds 150 and 155 for receiving formable compound, and shaped compartments 160 for storing objects during play. The toy 100 may include ring templates 165 that are used in conjunction with the molds 150, 155 for forming rings having formable compound designs. The toy 100 also may include compartment covers 170 that fit the compartments 160 and protect objects stored within the compartments 160.

The formable compound may be any non-toxic reusable modeling compound that is pliant, malleable, and/or dough-like. For example, the formable compound may remain soft indefinitely if kept in a tightly sealed container. One such formable compound that is commonly used is marketed under the brand name Play-Doh®. The formable compound may be a flour-based material, such as a material formed from flour, water, salt, colorant, and a flugicide, where the fungicide serves to prevent degradation. The formable compound may include pigments, dyes, or other materials that enhance its visual appeal.

Figure 2:
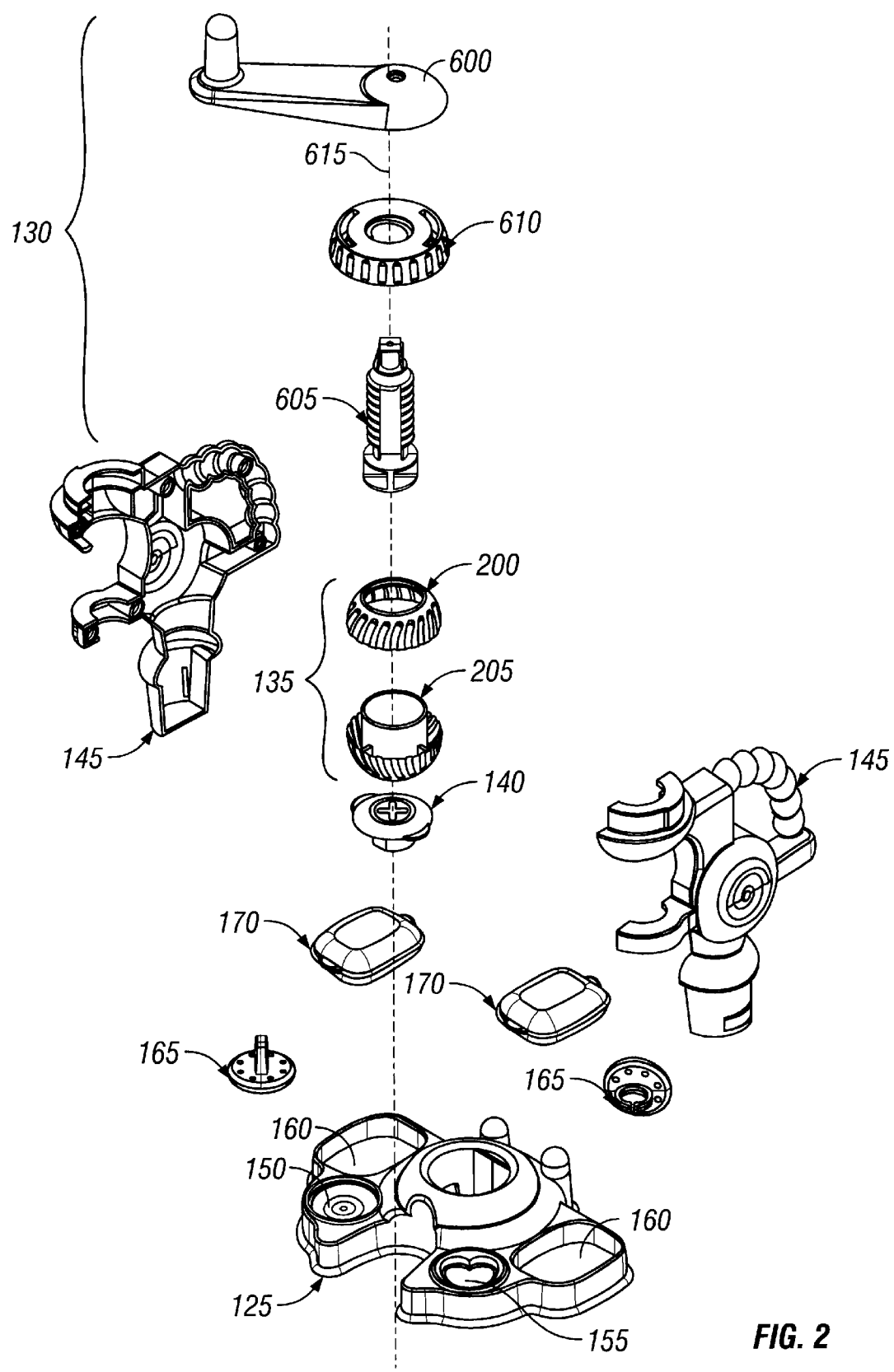
FIG. 2 is an exploded perspective view of the toy of FIG. 1.
Figure 3:
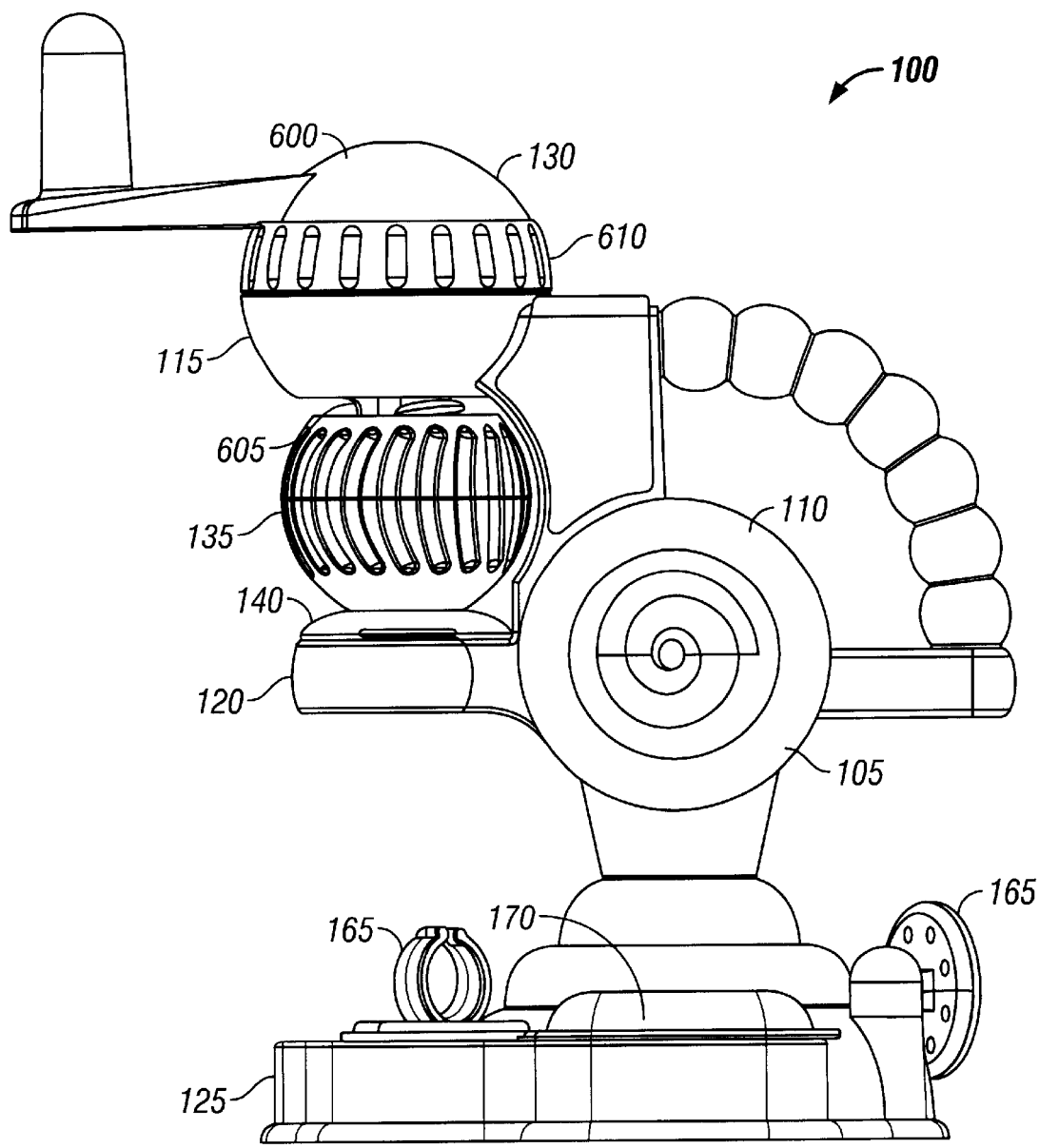
FIG. 3 is a side view of the toy of FIG. 1.
Figure 4:
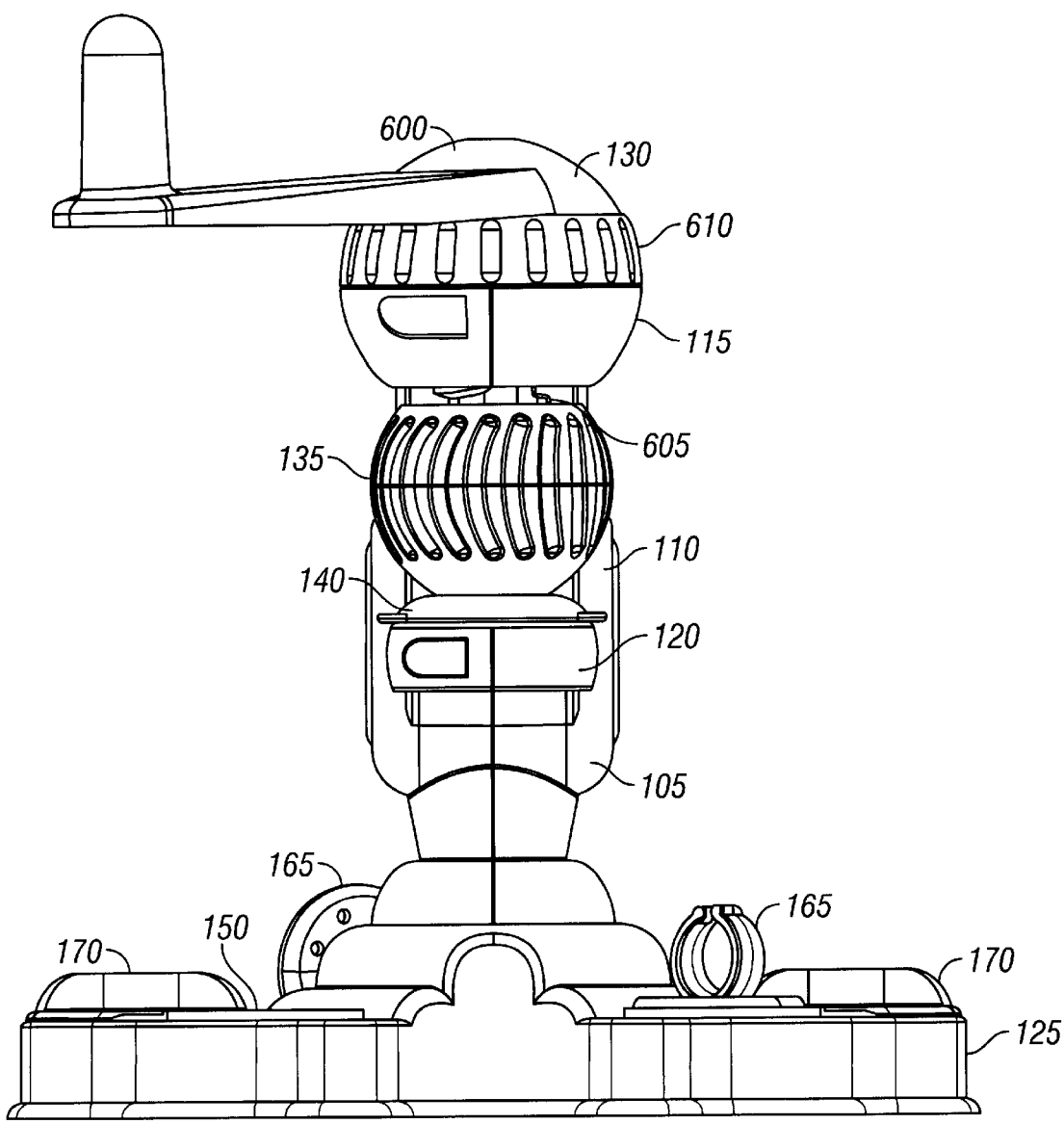
FIG. 4 is a front view of the toy of FIG. 1.
Figure 5:
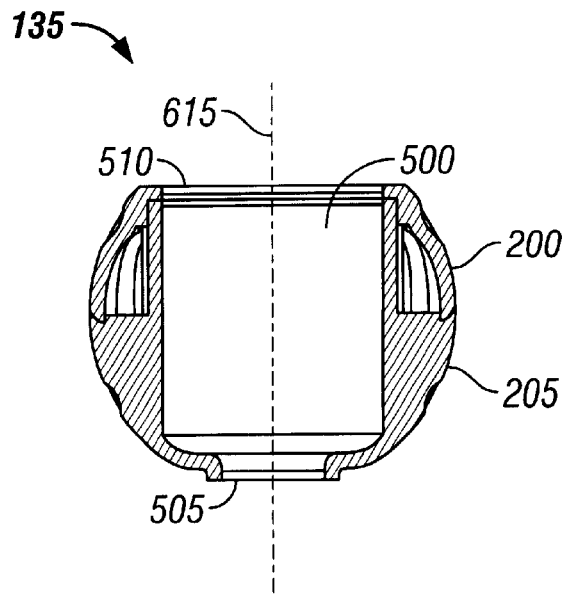
FIG. 5 is a cross-sectional view of a chamber of the toy of FIG. 1.

Referring also to FIG. 5, the chamber 135 may be assembled from first and second pieces 200 and 205, as shown in FIG. 2, to facilitate assembly. In another implementation, the chamber 135 may be made of a single piece. In any case, the chamber 135 has a hollow cylindrical interior 500, a first opening 505, and a second opening 510. The first opening 505 couples to the die 140 and the second opening 510 receives the plunger 130, as discussed in more detail below.

Figure 6:
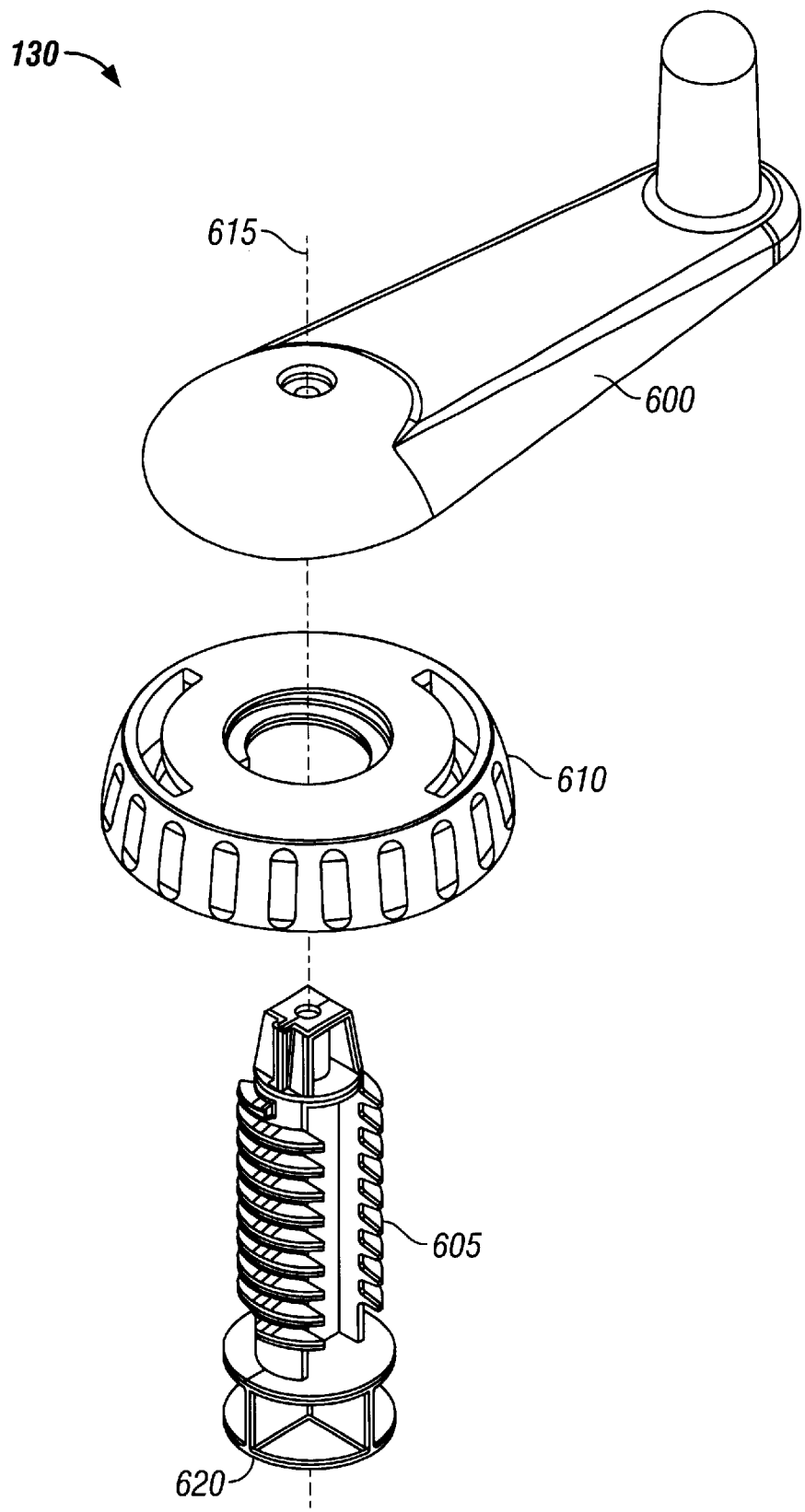
FIG. 6 is an exploded perspective view of a plunger of the toy of FIG. 1.

Referring also to FIG. 6, the plunger 130 includes a rotary device 600 (such as, for example, a crank), an extruder 605 (such as, for example, a screw) attached to the crank 600, and a cap 610. The cap 610 is positioned between the crank 600 and the extruder 605, and is secured to the second shelf 115. The cap 610 and the extruder 605 are able to rotate relative to each other. Thus, when the cap 610 is attached to the second shelf 115 and the rotary device 600 is rotated, the extruder 605 rotates about an axis 615 and advances along the axis 615 relative to the cap 610 and the housing 105. A lower surface 620 of the extruder 605 has a diameter approximately equal to the diameter of the cylindrical interior 500. In this way, the extruder 605 may slide through the second opening 510 and through the chamber 135 to the die 140.

Figure 7:
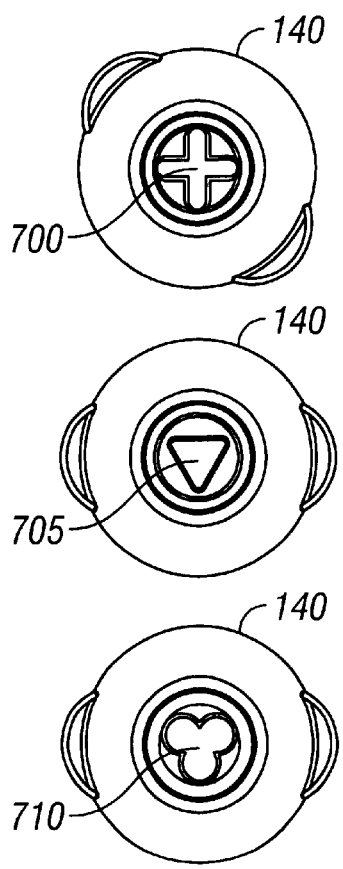
FIG. 7 shows top views of dies that may be used in the toy of FIG. 1.

Referring also to FIG. 7, the die 140 includes an opening through which the formable compound is forced during operation. As shown, the opening may be formed in any shape, such as, for example, the shapes of openings 700, 705, and 710. Common shapes include crosses, triangles, squares, stars, or clover shapes. In this way, different die shapes may be used to obtain different formable compound patterns.

Figure 8A:
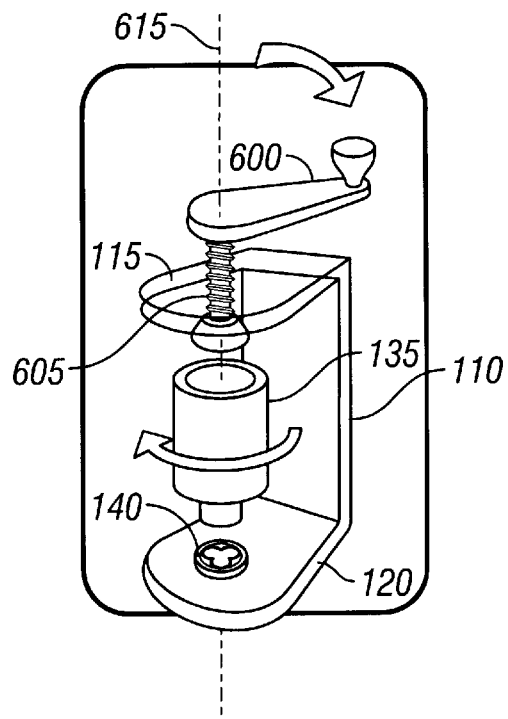
FIG. 8A is a perspective view of the toy of FIG. 1 illustrating the extrusion process.
Figure 8B:
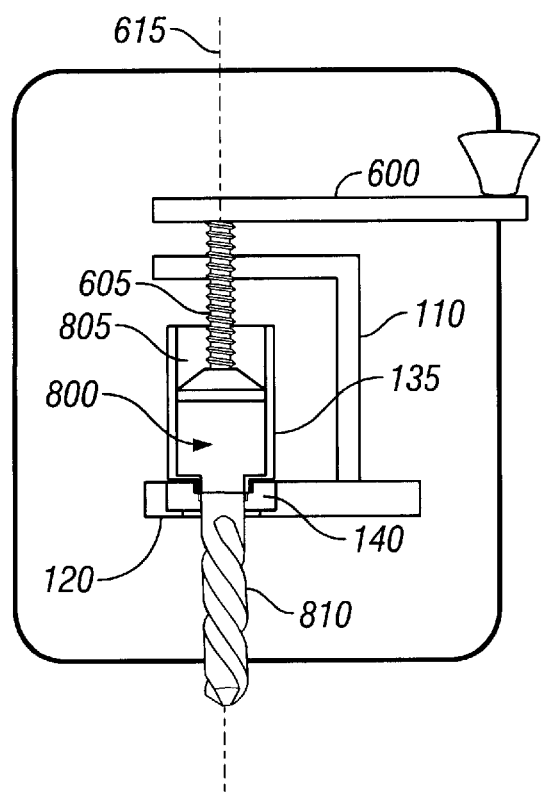
FIGS. 8B–8D are side cross-sectional views of the toy of FIG. 1 illustrating the extrusion process.
Figure 8D:
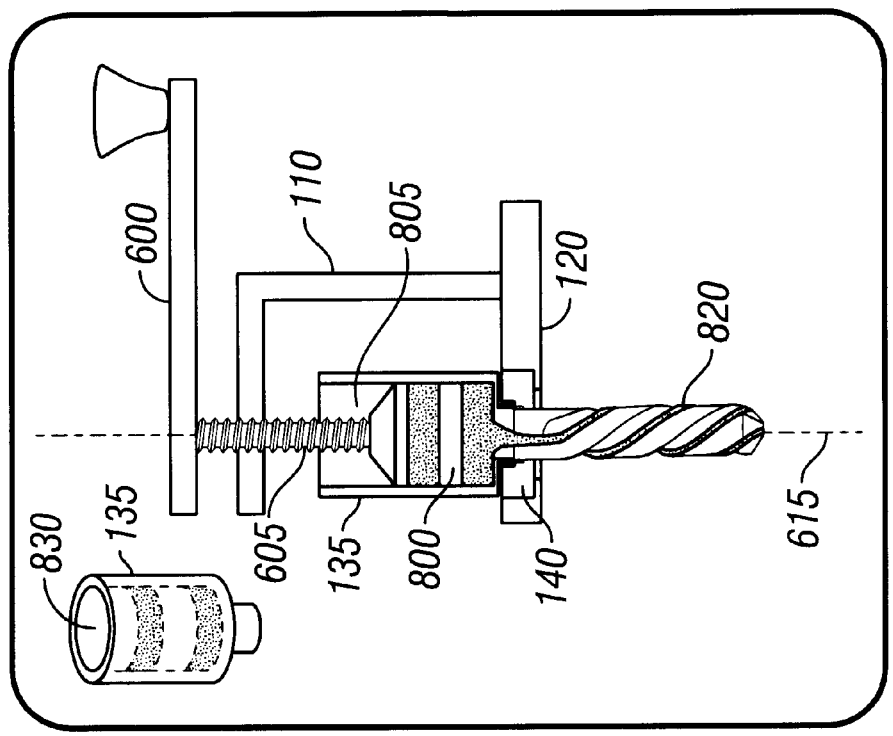
Figure 8C:
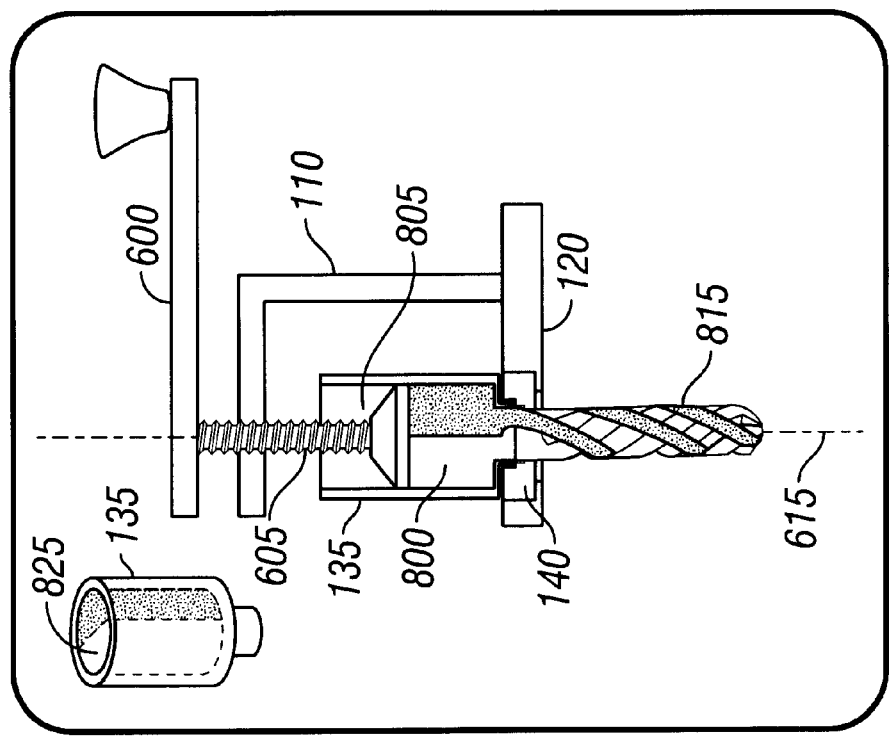

Referring also to FIGS. 8A–8D, formable compound 800 is extruded from a cavity 805 that defined the extruder 605, the chamber 135, and the die 140 to form different types of ornamental extrusions. When the extruder 605 is rotated around the axis 615 (for example, due to rotation of the rotary device 600), the extruder 605 also advances along the axis 615 and through the cavity 805. Because the extruder surface 620 contacts the formable compound 800 and because the extruder surface 620 has a diameter approximately the same as the inner diameter of the cylindrical interior 500, the rotational motion of the extruder 605 causes the formable compound 800 and the chamber 135 to rotate around the axis 615. Additionally, because the extruder surface 620 contacts the formable compound 800, the translational motion of the extruder 605 forces the formable compound 800 through the die 140. The formable compound 800 continues to rotate as it is forced through the die 140. Accordingly, the extrusion 810 (that is, the extruded formable compound) is twisted, as shown in FIG. 8B.

The formable compound 800 may come in any color. Thus, two or more differently-colored formable compounds 800 may be received within the cavity 805, which results in differently-styled twisted extrusions, such as the extrusions 815 and 820 shown in FIGS. 8C and 8D, respectively. For example, if two differently-colored formable compounds 800 are received within the cavity 805 in the arrangement 825 shown in FIG. 8C (differently-colored formable compounds are arranged around the axis 615), then the toy 100 produces the extrusion 815 that has a twist with shape lines formed by the die 140 in a first general direction and a color line formed by the two different colors in a second general direction. As another example, if two differently-colored formable compounds 800 are received within the cavity 805 in the arrangement 830 shown in FIG. 8D (differently-colored formable compounds are arranged along the axis 615), then the toy 100 produces the extrusion 820 that has a twist with a core of a first color (due to the color from one of the formable compounds within the cavity 805) and an outer ridge of a second color (due to the color from the other of the formable compounds within the cavity 805).

In other implementations, the die may be rotated concurrently with rotation of the extruder in a direction opposite to the rotational direction of the extruder. Rotation of the extruder (and thus the chamber) may be caused by any device that imparts a rotational force to the to the extruder (and thus the chamber), such as, for example, an electric motor actuator. Likewise, rotation of the die may be caused by any device that imparts a rotational force to the die, such as, for example, an electric motor actuator or a crank. In any case, if the chamber and extruder are rotated in a clockwise direction, then a rotatable die should be rotated in a counter-clockwise direction. In this way, the extrusion may be formed with a tighter twist.

The extruder 605 may be any device that imparts a rotational force to the chamber and the formable compound and a longitudinal force to the formable compound.

Differently shaped extrusions may be formed by replacing the die with a die of a different pattern, such as the patterns shown in FIG. 7.

Accordingly, other implementations are within the scope of the following claims.

What is claimed is:

1. A toy comprising:

a chamber having a longitudinal axis, a hollow interior, a first opening, and a second opening;

a die coupled to the first opening of the chamber; and an extruder received at the second opening of the chamber to define a cavity bound by the interior of the chamber, the first opening, and the extruder, with the extruder positioned to advance longitudinally through the chamber relative to the die;

wherein:

rotation of the extruder causes the chamber and formable compound received within the cavity to rotate relative to the die, and advancement of the extruder forces the rotating formable compound through the die.

2. The toy of claim 1 further comprising a housing that includes a body, a first shelf extending from a first portion of the body, a second shelf extending from a second portion of the body, and a base that supports the body.

3. The toy of claim 2 in which the extruder is mounted to the second shelf and able to move relative to the housing, the chamber is positioned between the first shelf and the second shelf to receive the extruder and to rotate relative to the housing, and the die is positioned between the chamber and the first shelf and is stationary with respect to the housing.

4. The toy of claim 3 in which the second opening of the chamber is coupled to the second shelf.

5. The toy of claim 1 further comprising a rotary device that causes rotation of the extruder.

6. The toy of claim 5 in which the rotary device comprises a crank.

7. The toy of claim 5 in which the rotary device comprises an electro-mechanical device.

8. The toy of claim 5 further comprising another rotary device that causes rotation of the die in a direction opposite to a rotational direction of the extruder.

9. The toy of claim 8 in which the other rotary device comprises a crank.

10. The toy of claim 8 in which the other rotary device comprises an electro-mechanical device.

11. The toy of claim 1 in which the extruder includes a surface that contacts the formable compound received within the cavity, and a diameter of the cylindrical interior is approximately the same as a diameter of the extruder surface.

12. The toy of claim 1 in which the extruder includes a screw.

* * * * *